United States Patent
Inoue et al.

(10) Patent No.: US 10,936,263 B2
(45) Date of Patent: Mar. 2, 2021

(54) COMMUNICATION TERMINAL, METHOD OF CONTROLLING SAME, AND STORAGE MEDIUM

(71) Applicant: CANON KABUSHIKI KAISHA, Tokyo (JP)

(72) Inventors: Go Inoue, Fujisawa (JP); Takahiro Matsushita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/247,778

(22) Filed: Jan. 15, 2019

(65) Prior Publication Data
US 2019/0220235 A1 Jul. 18, 2019

(30) Foreign Application Priority Data
Jan. 18, 2018 (JP) .............................. JP2018-006689

(51) Int. Cl.
*G06F 3/12* (2006.01)
(52) U.S. Cl.
CPC .......... *G06F 3/1255* (2013.01); *G06F 3/1205* (2013.01); *G06F 3/1271* (2013.01); *G06F 3/1285* (2013.01)
(58) Field of Classification Search
None
See application file for complete search history.

(56) References Cited

U.S. PATENT DOCUMENTS

| 7,268,897 | B1 | 9/2007 | Moro et al. | |
|---|---|---|---|---|
| 2009/0292772 | A1* | 11/2009 | Uchikawa | G06F 16/00 709/204 |
| 2015/0317108 | A1* | 11/2015 | Hadano | G06F 3/1231 358/1.15 |
| 2015/0355916 | A1 | 12/2015 | Inoue | |
| 2016/0171351 | A1* | 6/2016 | Scillieri | G06F 3/1234 358/1.15 |
| 2016/0182757 | A1* | 6/2016 | Yoo | H04N 1/32085 358/1.15 |
| 2018/0063360 | A1* | 3/2018 | Ida | H04N 1/00411 |

FOREIGN PATENT DOCUMENTS

JP  2010171473 A  8/2010

\* cited by examiner

*Primary Examiner* — Frantz Bataille
(74) *Attorney, Agent, or Firm* — Venable LLP

(57) ABSTRACT

A mobile terminal (a communication terminal) searches for image forming apparatuses that can use a predetermined service (a print service), and displays, as search results, one or more image forming apparatuses that responded to the search. Furthermore, in the search results, the mobile terminal identifiably displays, in accordance with the response from each image forming apparatus, image forming apparatuses that can use the predetermined service, and image forming apparatuses that cannot use the predetermined service because a setting for the service is set to disabled.

15 Claims, 20 Drawing Sheets

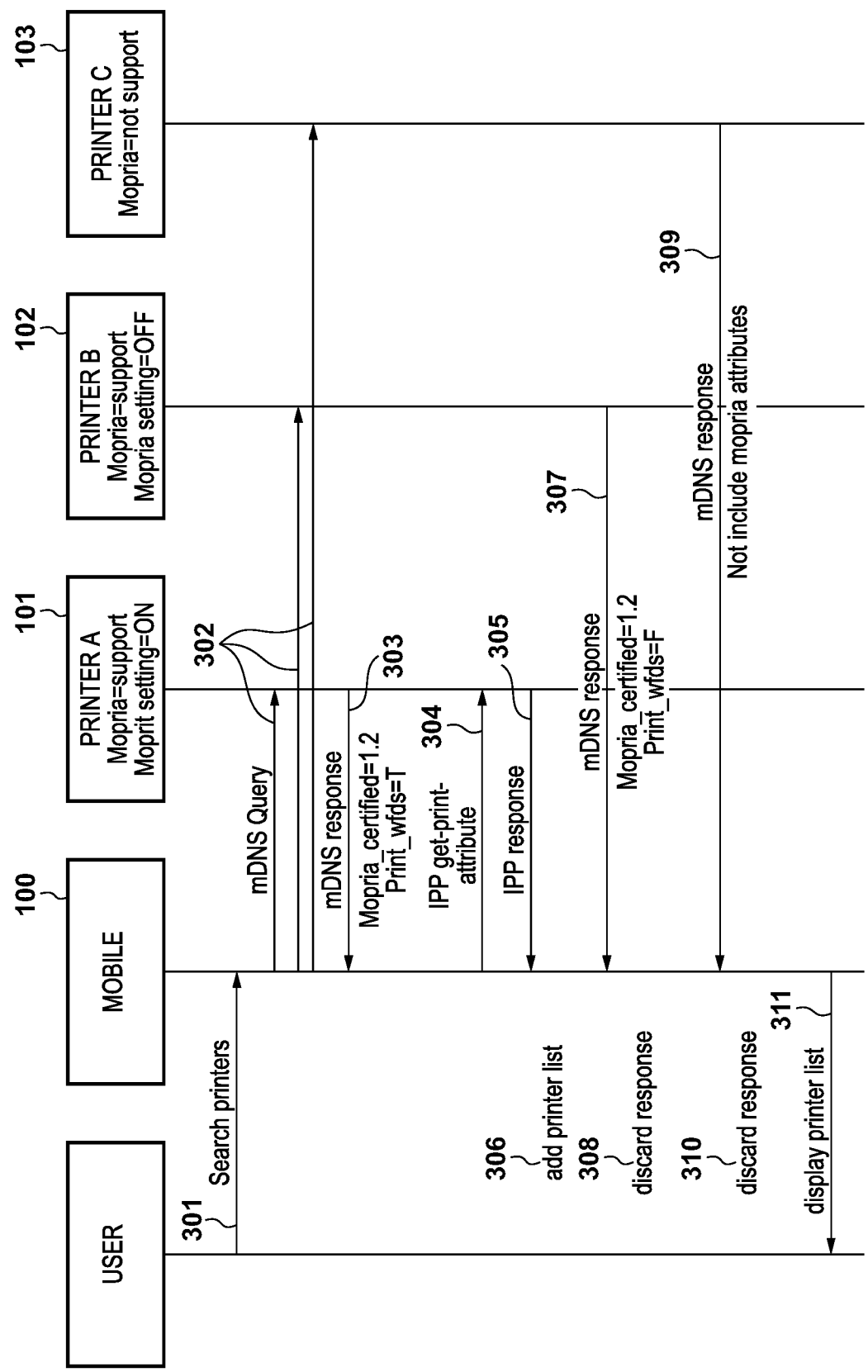

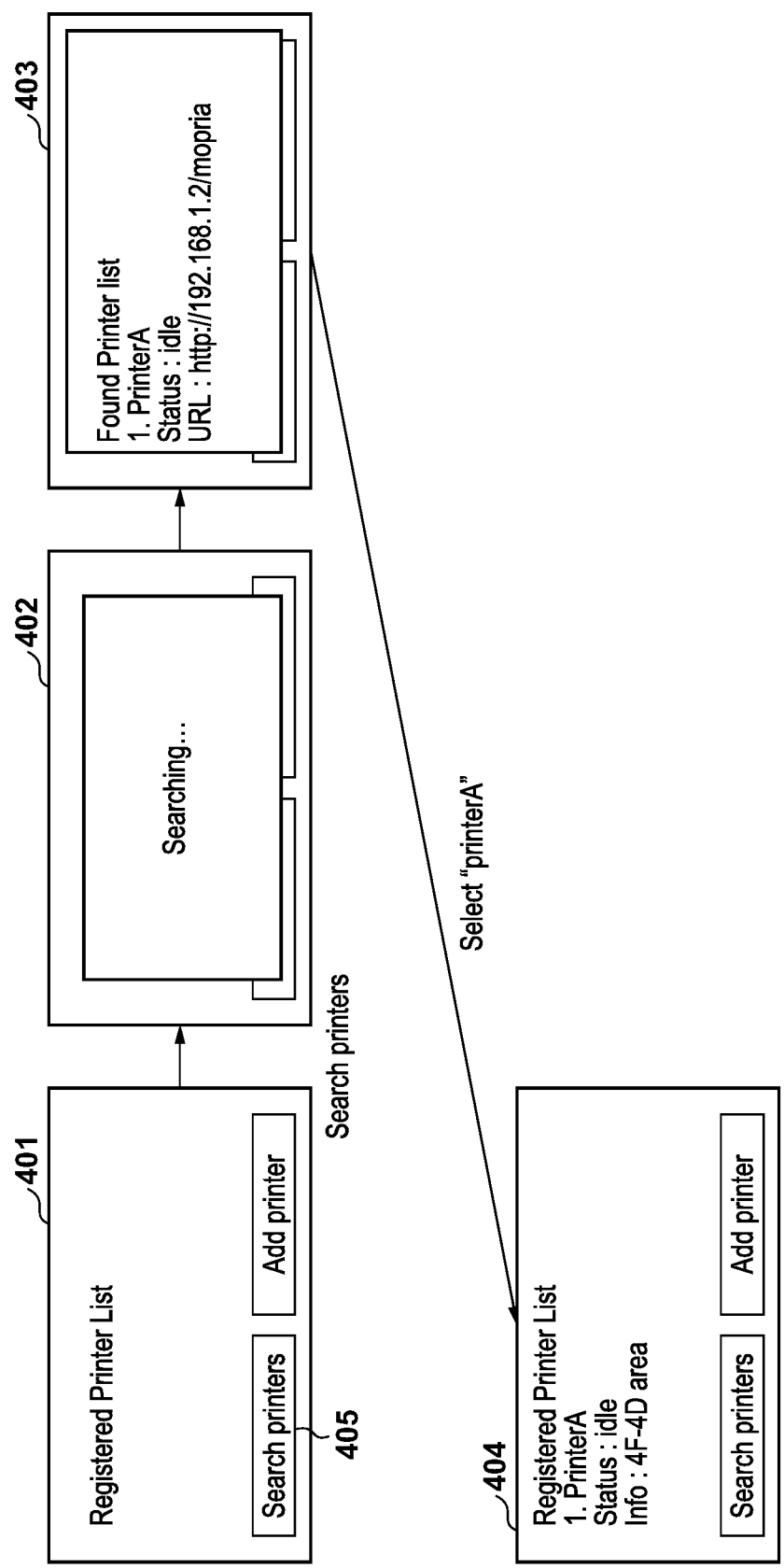

FIG. 5

501
Query/response : mDNS Query
Name : _ipp._tcp.local
Type : Domain Name Printer

502
Query/response : mDNS Query
Name : _ipp._tcp.local
Type : Domain Name Printer Additional record
Name : PrinterA
Type : TEXT
Mopria_certified = 1.2
Print_wfds = True
Info = 4F-4E
URL : http://192.168.1.2/mopria Type : SRV
Port : 515
Protocol : LPD Type : SRV
Port : 631
Protocol : IPP

503
Query/response : mDNS Query
Name : _ipp._tcp.local
Type : Domain Name Printer Additional record
Name : PrinterB
Type : TEXT
Mopria_certified = 1.2
Print_wfds = False
Info = 4F-4B
URL : http://192.168.1.3/mopria Type : SRV
Port : 515
Protocol : LPD Type : SRV
Port : 631
Protocol : IPP

504
Query/response : mDNS Query
Name : _ipp._tcp.local
Type : Domain Name Printer Additional record
Name : PrinterC
Type : TEXT
Info = 3F-3A
URL : http://192.168.1.4/top Type : SRV
Port : 515
Protocol : LPD

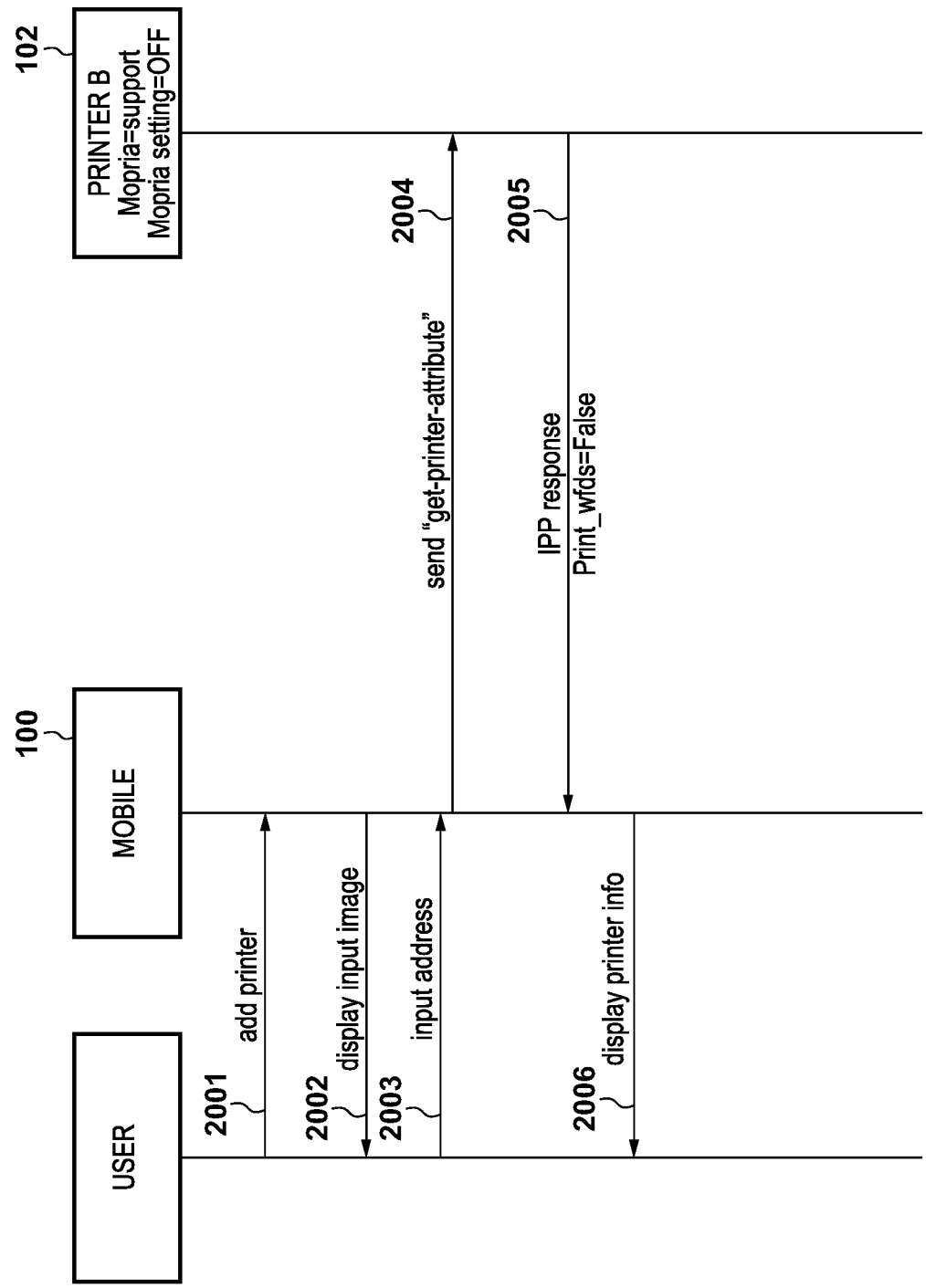

COMMUNICATION TERMINAL, METHOD OF CONTROLLING SAME, AND STORAGE MEDIUM

BACKGROUND OF THE INVENTION

Field of the Invention

The present invention relates to a communication terminal, a method of controlling the same, and a storage medium.

Description of the Related Art

Conventionally, it is possible to search for image forming apparatuses such as a printer that are present on a network from an information terminal such as a PC and a mobile terminal such as a smart phone or a tablet, display results of the search on a terminal that is a client, and use the image forming apparatus. In such a case, techniques such as WS-Discovery or mDNS are used as the protocol to search for image forming apparatuses, and both use multicasting. The client which performs the search transmits the search request to the network by multicast, and can find image forming apparatuses on the network by the image forming apparatuses, after receiving the search request, returning a response. By using a protocol such as IPP or WSD with respect to a discovered image forming apparatus, processing for obtaining a state or more detailed information of the image forming apparatus, or print processing is performed.

For example, in Japanese Patent Laid-Open No. 2010-171473, an example in which a search protocol and a print protocol are used is introduced. In addition, for example, in a Mopria print service, multicast DNS (hereinafter abbreviated as mDNS) is used to search for a printer, and IPP is used as a print protocol.

However, there is a problem as is recited below in the foregoing conventional technique. For example, in the foregoing conventional techniques, if print service attributes are not included in a search response the client terminal determines that the image forming apparatus is not equipped with the print service, and does not display this image forming apparatus in the list of search results. In addition, print service attributes are included in a search response, but if information indicating that a print service setting is off is included therein, the client terminal determines that the image forming apparatus cannot print by the print service, and does not display this image forming apparatus in the list of search results.

However, when such image forming apparatuses are not displayed, the user cannot determined whether an image forming apparatus that is not displayed is one that does not support the print service or one that supports the print service but for which the setting therefor is off. In other words, there is the problem that a determination cannot be made because, in spite of the fact that an image forming apparatus whose setting is off can be put in a usable state if the setting is changed to on, the image forming apparatus is not displayed as a search result.

SUMMARY OF THE INVENTION

The present invention enables realization of a mechanism for, when searching for image forming apparatuses that can use a predetermined service function, outputting search results that identifiably include an image forming apparatus that, even if usage is disabled, can become usable if a setting of the image forming apparatus is changed; in addition, the present invention provides a mechanism for providing a user interface for changing this setting.

One aspect of the present invention provides a communication terminal, comprising: a display unit; a memory device that stores a set of instructions; and at least one processor that executes the set of instructions to: search for image forming apparatuses that can use a predetermined service; and display on the display unit one or more image forming apparatuses that responded to the search, and, in accordance with a response from each image forming apparatus, display on the display unit search results in which it is possible to identify an image forming apparatus that can use the predetermined service and an image forming apparatus that cannot use the predetermined service because a setting for the predetermined service is set to disabled.

Another aspect of the present invention provides a method of controlling a communication terminal provided with a display unit, the method comprising: searching for image forming apparatuses that can use a predetermined service; and displaying on the display unit one or more image forming apparatuses that responded to the searching, as search results for the searching, wherein, in a case of displaying the search results, based on responses from each image forming apparatus, identifiably displaying an image forming apparatus that can use the predetermined service, and an image forming apparatus that cannot use the predetermined service because a setting for the predetermined service is set to disabled.

Still another aspect of the present invention provides a non-transitory storage medium storing a program for causing a computer of a communication terminal provided with a display unit to execute: searching for image forming apparatuses that can use a predetermined service; and displaying on the display unit one or more image forming apparatuses that responded to the searching, as search results for the searching, wherein, in a case of displaying the search results, based on responses from each image forming apparatus, identifiably displaying an image forming apparatus that can use the predetermined service, and an image forming apparatus that cannot use the predetermined service because a setting for the predetermined service is set to disabled.

Further features of the present invention will be apparent from the following description of exemplary embodiments with reference to the attached drawings.

BRIEF DESCRIPTION OF THE DRAWINGS

FIG. 3 is a search sequence diagram for a comparative example.

FIG. 4 is a view illustrating an operation panel of a mobile terminal which is a comparative example.

FIG. 5 is a view that illustrates search packets according to an embodiment.

FIG. 20 is a search sequence diagram according to an embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Hardware Configuration>

Figure 1:
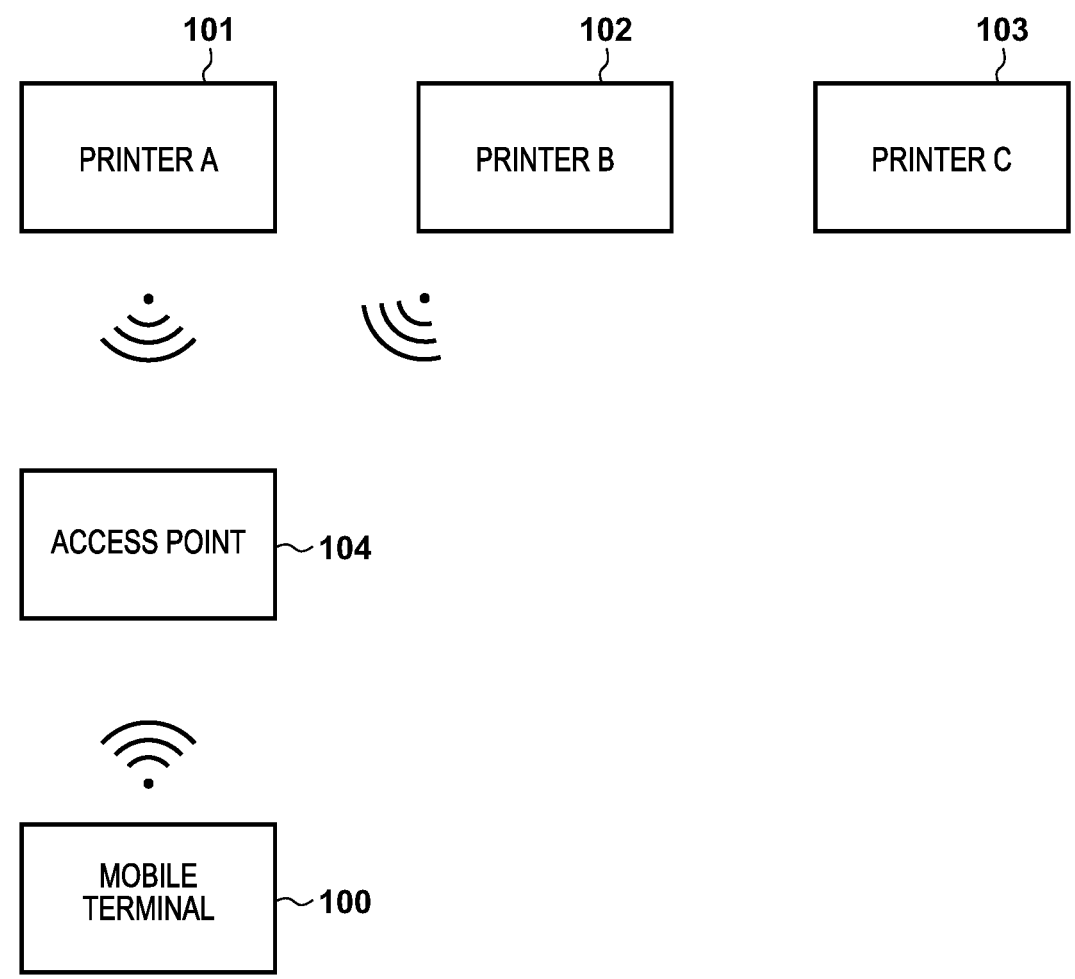
FIG. 1 is a view that illustrates a configuration of a network according to an embodiment.

Below, description will be given for a first embodiment of the present invention. Firstly, with reference to FIG. 1, description is given of an example of a network configuration of the present embodiment. A mobile terminal 100 and image forming apparatuses 101, 102, and 103 perform communication with each other via an access point 104. Note there is no intention to limit the present invention to the configuration example of FIG. 1, and more mobile terminals and image forming apparatuses may be connected, for example. In addition, the mobile terminal 100 may be a different information terminal such as a PC. In addition, instead of wireless communication, communication may be mutually performed by wired communication. Here, for the image forming apparatus 101 a print service such as Mopria (registered trademark) is set to on, for the image forming apparatus 102 Mopria is set to off, and for the image forming apparatus 103 a Mopria function is not even installed.

The mobile terminal 100 is an example of a communication terminal, and can connect with the image forming apparatuses 101 through 103 via wireless communication. The mobile terminal 100 according to the present embodiment searches for image forming apparatuses that can execute a predetermined service function, for example a print service, and outputs a search result by displaying, for example. Furthermore, the mobile terminal 100 can communicate with an image forming apparatus selected via an outputted search result and use a service such as a print service.

The image forming apparatuses 101 through 103 are image forming apparatuses that have at least one device such as a printer, a fax machine, and a scanner. The image forming apparatuses 101 through 103 can provide various services, such as printing, copying, scanning, or a facsimile transmission, for example, to an external apparatus connected by a wired connection or a wireless connection. Note that it is possible to the image forming apparatuses 101 through 103 to change provided services in accordance with settings. The access point 104 is a relay apparatus for making wireless connections between the image forming apparatuses 101 through 103 and the mobile terminal 100.

<Mobile Terminal>

Figure 2:
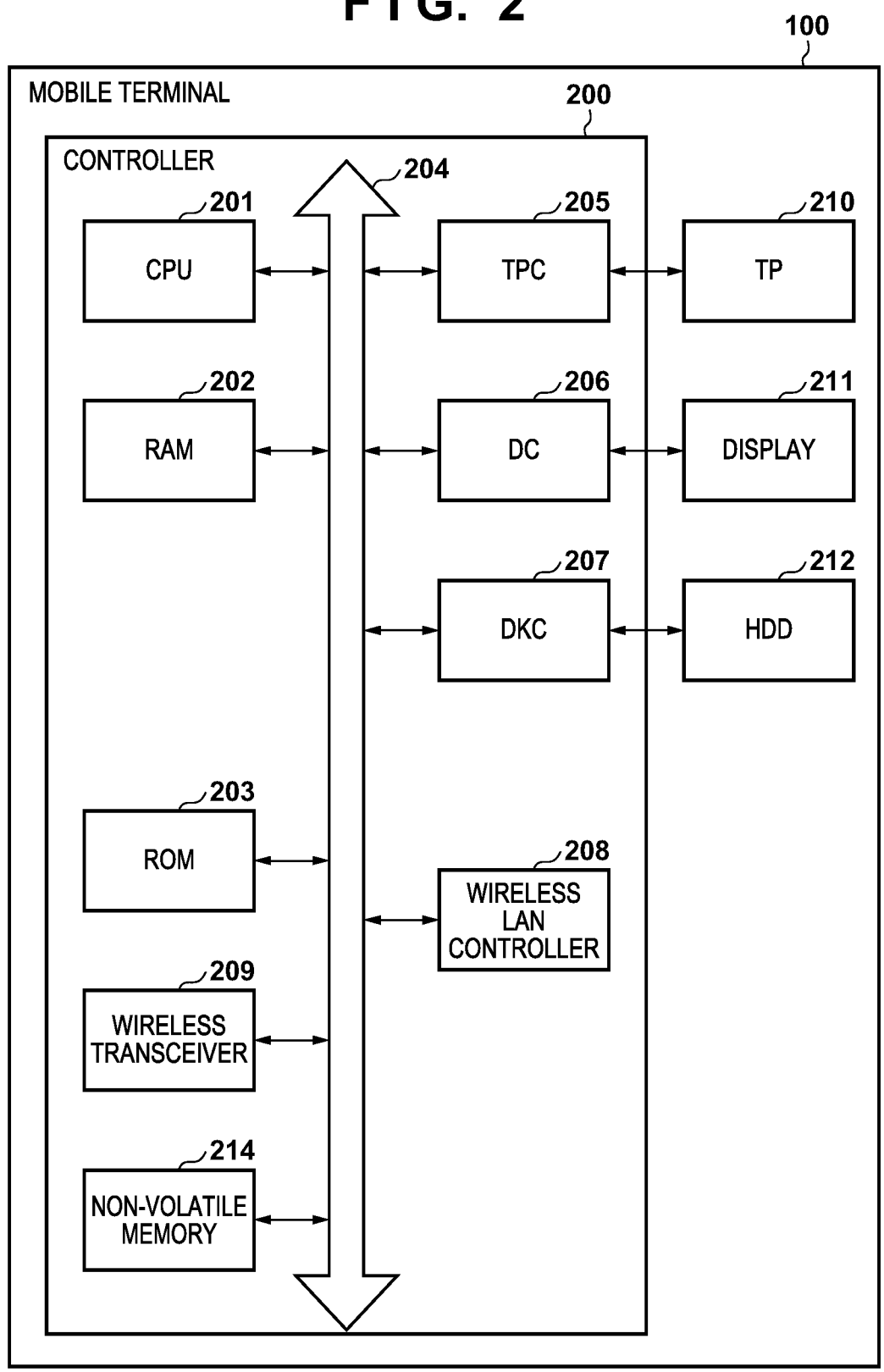
FIG. 2 is a hardware configuration diagram of a mobile terminal according to an embodiment.
Figure 6:
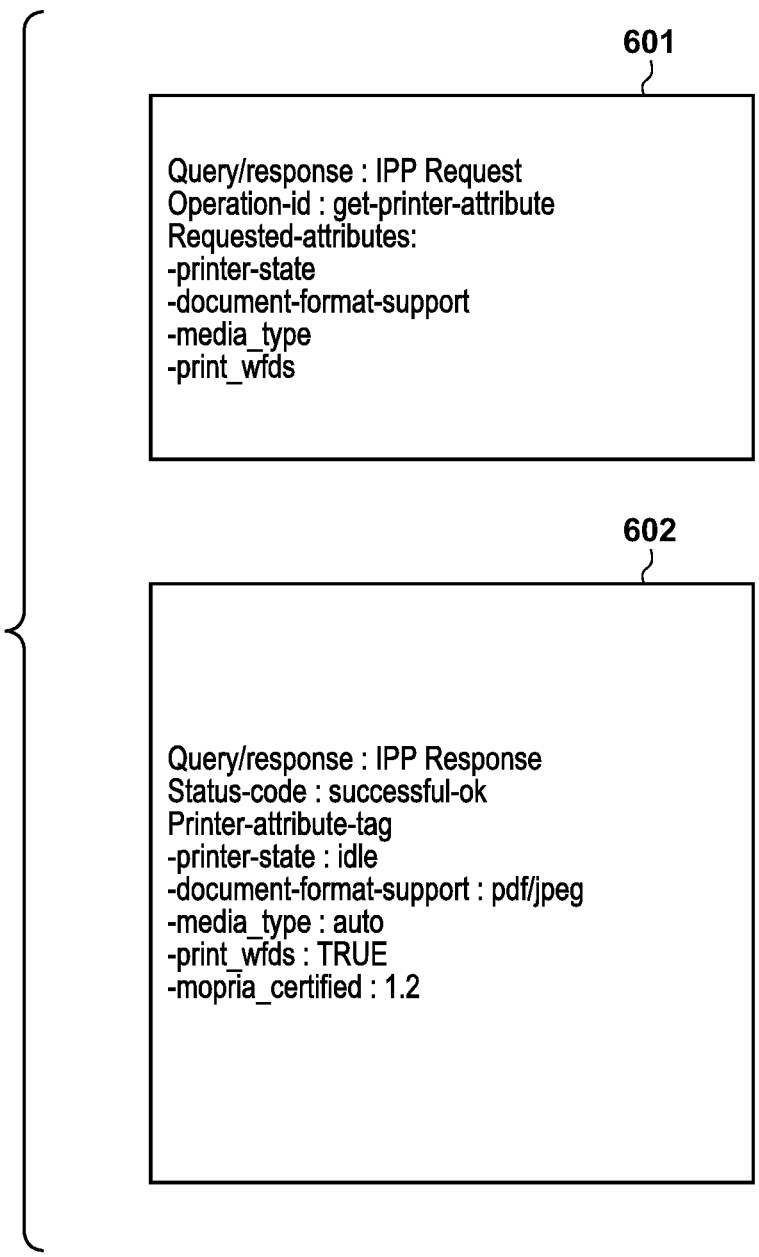
FIG. 6 is a view that illustrates packets for obtaining print information according to an embodiment.

Next, with reference to FIG. 2, description is given for a hardware configuration of the mobile terminal 100 which is a communication terminal. Description is given by taking a smart phone as an example of a mobile terminal, but there is no intention to limit the present invention.

The mobile terminal 100 is provided with a controller 200, a touch panel (TP) 210 which is an operation unit, a display 211, and an HDD 212. The controller 200 is provided with a CPU 201, a RAM 202, a ROM 203, a touch panel controller (TPC) 205, a display controller 206, a disk controller (DKC) 207, a wireless LAN controller 208, a wireless transceiver 209, and a non-volatile memory 214. These components can transmit signals to one another by a system bus 204.

The CPU (Central Processing Unit) 201 controls various components connected to the system bus 204. The ROM (Read Only Memory) 203 stores a BIOS or a boot program. The RAM (Random Access Memory) 203 is used as a main storage apparatus for the CPU 201. The TPC 205 is a touch panel controller, and performs processing to notify the CPU 201 after detecting a contact state of the touch panel (TP) 210. The display controller (DC) 206 performs display control of the display 211. The disk controller (DKC) 207 controls access to the hard disk (HDD) 212. The HDD 212 stores an OS that operates on the mobile terminal 100, various application programs, various data files, and the like. The CPU 201 can load an application program stored in the HDD 212 to the RAM 203, and execute the application program. Note that, in the present embodiment, it is assumed that at least a Web browser application and a predetermined print application are installed in the mobile terminal 100. Note that an example of the predetermined print application is a Mopria print application (a Mopria print plugin) provided by Mopria. Note that such an application program can be installed from an application server (not illustrated) by way of a user operation, and may be pre-installed on the mobile terminal 100. The wireless LAN controller 206 is connected to a wireless LAN network, and performs information communication via the network. The wireless transceiver 209 performs information communication by connecting to a 3G or 4G portable telephone communication network. The non-volatile memory 214 stores various setting information. Note that it is assumed that the mobile terminal 100 executes various processing illustrated in sequence or flowcharts described later by using one of the CPU 201 and one memory (the RAM 203), but other embodiments are also possible. For example, a plurality of processors and a plurality of RAMs may cooperate with a ROM and storage to execute various processing illustrated in flowcharts described later.

<Search Procedure of Comparative Example>

Next, with reference to FIG. 3 and FIG. 4, description is given for an example of an operation panel of the mobile terminal 100 and a search procedure sequence in an image forming apparatus which is a comparative example. Reference numeral 401 of FIG. 4 illustrates a top screen for a case where a Mopria print application (a predetermined service) is activated in the mobile terminal 100. Because no image forming apparatus has been registered yet, nothing is displayed in a registered printer list. As indicated by reference numeral 301 of FIG. 3, when a user selects an "image forming apparatus search" button 405, a transition is made to a screen of the reference numeral 402, and a screen indicating that image forming apparatuses are being searched for is displayed. At this point, the mobile terminal 100 transmits a search request packet by mDNS (multicast) to each image forming apparatus (an image forming apparatus 101-C) as with reference numeral 302.

The image forming apparatus 101, which has received a search request of reference numeral 501 of FIG. 5, responds by a packet as with reference numeral 502 at reference numeral 303. The response packet 502 includes a "Mopria_certified" record indicating Mopria support because the image forming apparatus 101 supports Mopria. In addition, because "Mopria setting=ON", the response packet 502 is generated with the value of an attribute "Print_wfds" record which represents the state of the Mopria setting set to "True". In addition, the response packet 502 also includes a "UUID" record or "Name" record that represents a printer name, and an "Info" record that indicates position information for the printer. The response packet 502 includes a "Printer State" record which represents a printer state, and an "Info" record representing print service information that is supported.

Next, at reference numeral 304, because the mobile terminal 100 was able to determine that the Mopria setting of the image forming apparatus 101 was enabled, the mobile terminal 100 obtains more detailed information by an IPP (Internet Printing Protocol) "get-print-attribute" operation. Reference numeral 602 is an example of packet data that the image forming apparatus 101 responds with at reference numeral 305. Some data overlaps with the information of reference numeral 502, but more detailed information of the printer, such as information on media types and media sizes supported, is also included. At reference numeral 306, the mobile terminal 100 adds the obtained printer information to a printer list which is held in the RAM 202.

Next, at reference numeral 307, the image forming apparatus 102, which has received the search request, responds with a packet that has the "Print_wfds" record set to "False" as in reference numeral 503, because the image forming apparatus 102 stores "Mopria_certified" as it supports Mopria and has "Mopria setting=OFF". At reference numeral 308, the mobile terminal 100 determines that the Mopria setting of the image forming apparatus 102 is disabled, and thus does not add the image forming apparatus 102 to the printer list.

At reference numeral 309, the image forming apparatus 103, which receives the search request, responds with a packet illustrated by reference numeral 504 of FIG. 5. Because the image forming apparatus 103 does not support the Mopria function itself, this packet does not include "Mopria_certified" or "Print_wfds" records. At reference numeral 310, the mobile terminal 100 determines that the image forming apparatus 103 is not equipped with a Mopria function, and thus does not add the image forming apparatus 103 to the printer list. Finally, at reference numeral 311, the mobile terminal 100 displays the list of found printers on an operation panel as in reference numeral 403 of FIG. 4. In this case, only the image forming apparatus 101 which has "Mopria setting=ON" is displayed. By a user selecting one desired image forming apparatus from reference numeral 403 and registering it to the registered printer list, usage by a print procedure becomes possible (reference numeral 404).

However, with the search procedure for the comparative example described above, the image forming apparatus 102 which has "Mopria setting=OFF" and similarly the image forming apparatus 103 which does not support a Mopria function are not displayed in the reference numeral 403. There are also image forming apparatuses that are shipped with an initial setting of "Mopria setting=OFF". In this case, the image forming apparatus 102 will enter a usable state if the Mopria setting is changed to ON, but a user will cannot notice this if the image forming apparatus 102 is not displayed as a search result.

<Proposed Search Procedure>

Figure 7:
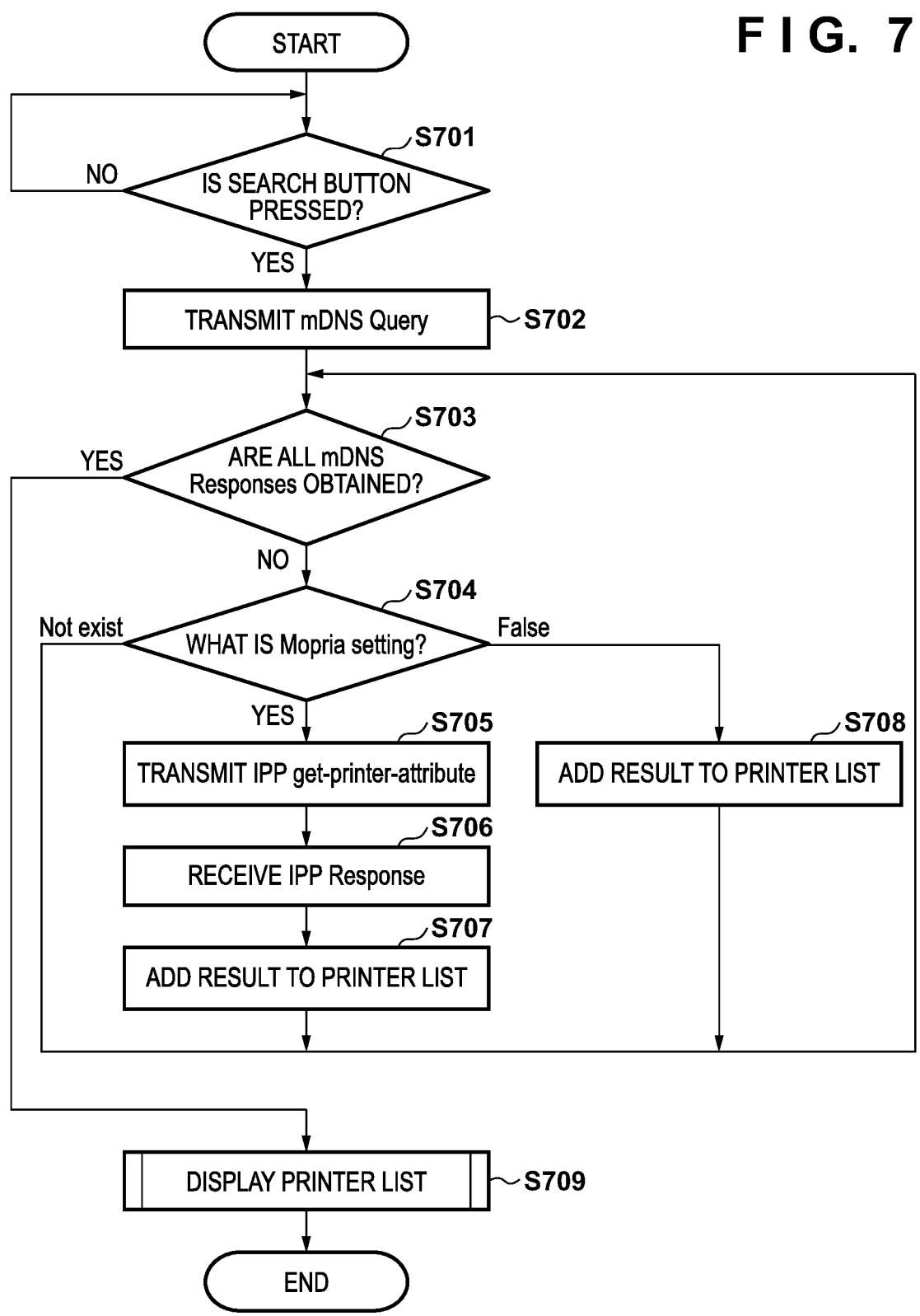
FIG. 7 is a search flowchart according to an embodiment.
Figure 8:
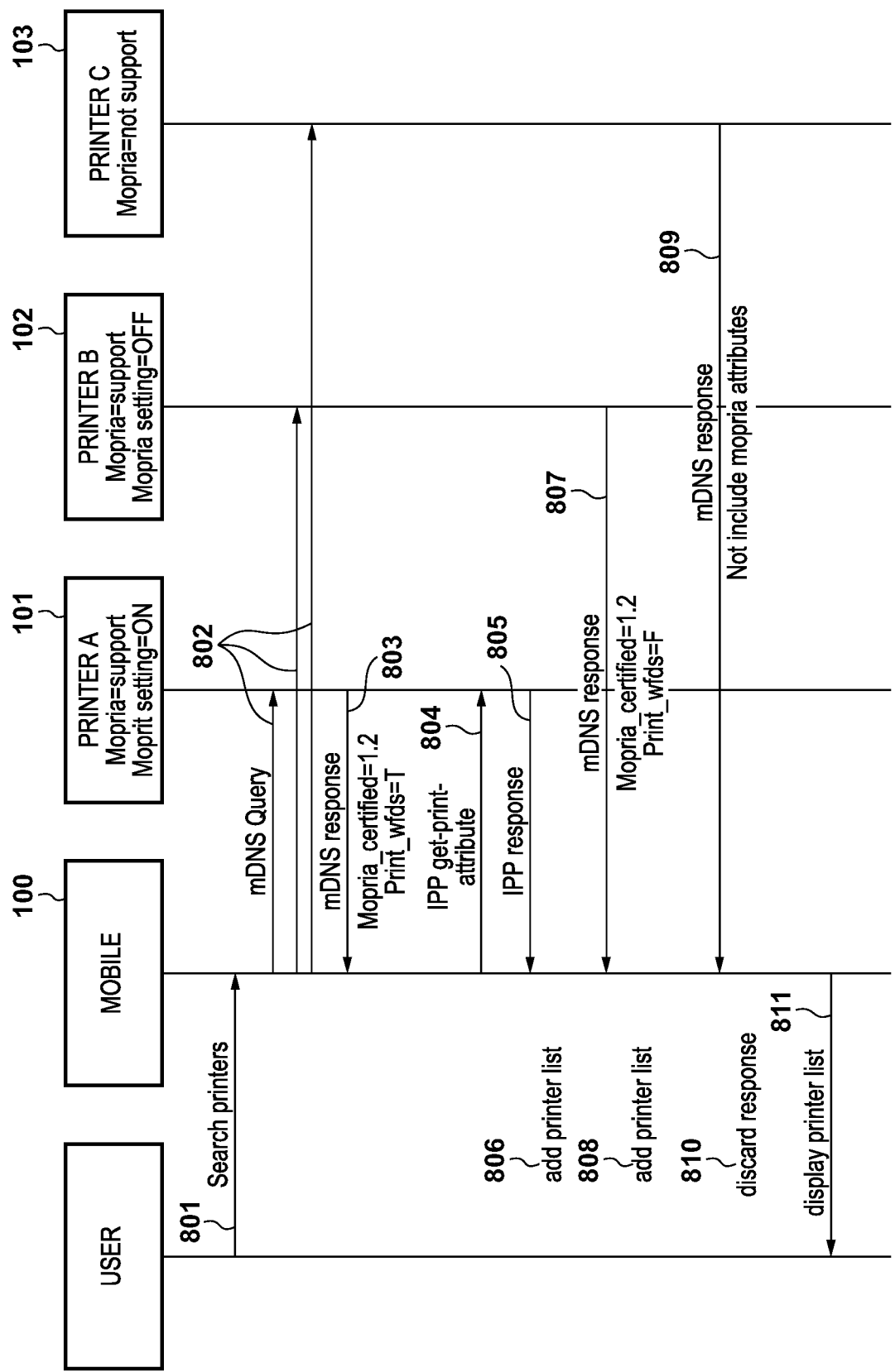
FIG. 8 is a sequence diagram for searching for an image forming apparatus according to an embodiment.
Figure 9:
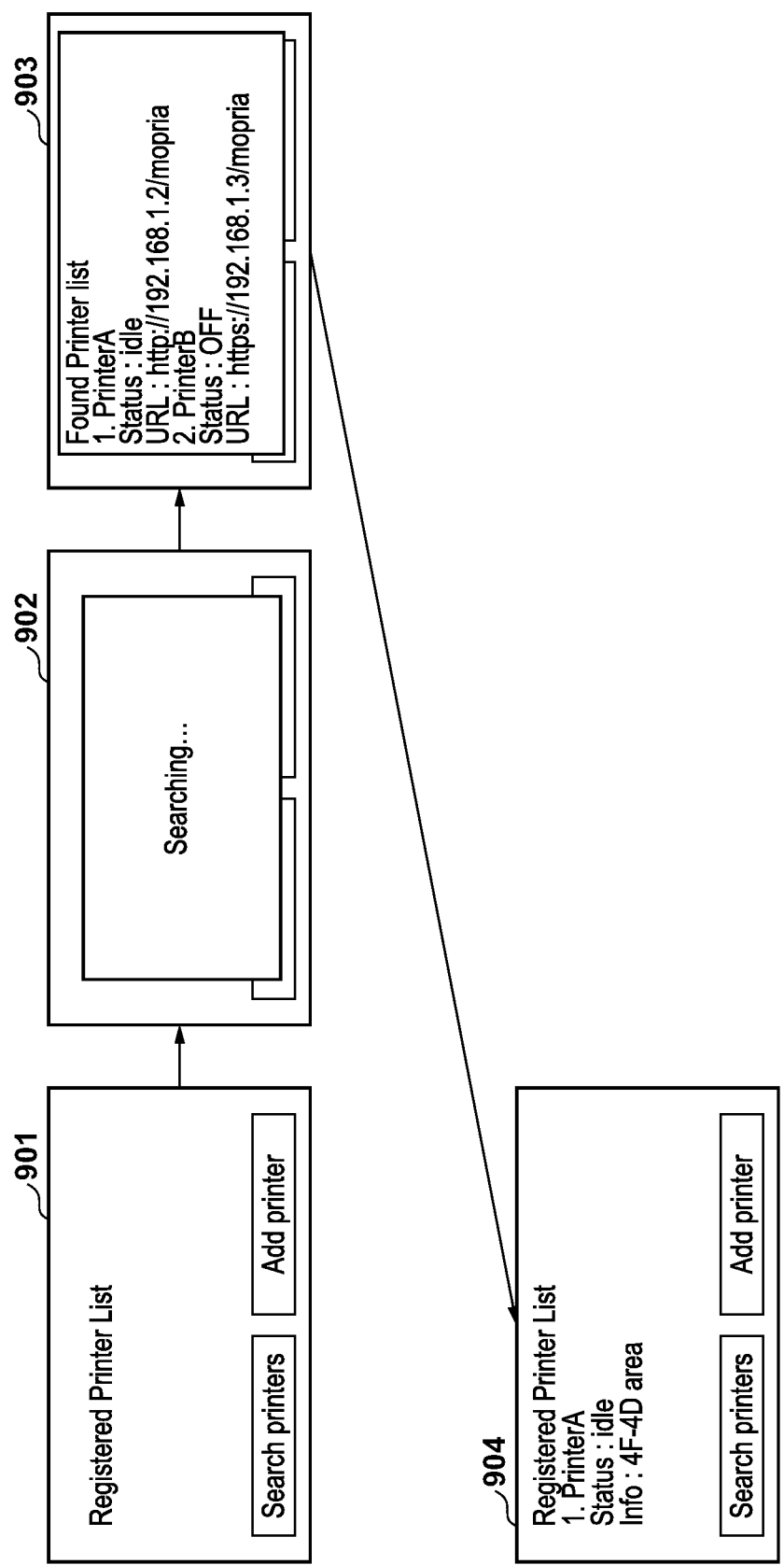
FIG. 9 is a view that illustrates an operation panel of a mobile terminal according to an embodiment.

Next, with reference FIG. 7, description is given for a processing procedure for searching for image forming apparatuses from the mobile terminal 100. A program of the mobile terminal 100 corresponding to this flowchart is stored in the HDD 212, is read into the RAM 202, and is executed by the CPU 201. The processing executed by the CPU 201 is represented as "mobile terminal" below. Note that the processing according to the flowchart of FIG. 7 is executed by the CPU 201 executing a predetermined print application (for example, a Mopria print application) program that has been installed on the mobile terminal 100. Note that it is assumed that some processing (for example, processing to accept a user operation, processing to display a screen, or transmission and reception processing for data) is realized by the CPU 201 cooperating with, for example, an OS that operates on the mobile terminal 100, or the wireless LAN controller 206.

In step S701, the mobile terminal 100 detects that a "search button" of reference numeral 901 has been selected by a user (reference numeral 801). In step S702, the mobile terminal 100 transmits an image forming apparatus search request packet as with reference numeral 501 of FIG. 5 to cause the operation panel screen to transition to reference numeral 902 (reference numeral 802). In step S703, the mobile terminal 100 receives search request responses from the image forming apparatuses 101 through 103 that are on the same network, and thus processes each of the responses. A response packet having "Mopria setting=ON" as with reference numeral 502 is received from the image forming apparatus 101 (reference numeral 803). Accordingly, the mobile terminal 100 can determine that the Mopria setting is enabled for the image forming apparatus 101, because "Mopria_certified" is included, and "Print_wfds" is true. Accordingly, in step S705, the mobile terminal 100 transmits a packet for requesting information of the image forming apparatus in more detail, as with reference numeral 601 (reference numeral 804). In step S706, the mobile terminal 100 receives the detailed information of the image forming apparatus as in reference numeral 602 from the image forming apparatus 101 (reference numeral 805). In step S707, the mobile terminal 100 adds the information of the image forming apparatus 101 to a printer list (reference numeral 806).

A response packet having "Mopria setting=OFF" as with reference numeral 503 is received from the image forming apparatus 102 (reference numeral 807). The mobile terminal 100 can determine that the Mopria setting is disabled for the image forming apparatus 102, because "Mopria_certified" is included, and "Print_wfds" is false. Accordingly, in step S708, the mobile terminal 100 adds information of the image forming apparatus 102 with "Status=OFF" to the printer list (reference numeral 808).

A response packet as with reference numeral 504 is received from the image forming apparatus 103 which is not equipped with a Mopria function (reference numeral 809). The mobile terminal 100 determines that the image forming apparatus 103 does not support Mopria because both "Mopria_certified" and "Print_wfds" are not included, and thus does not add information of the image forming apparatus 103 to the printer list (reference numeral 810).

In step S709, the mobile terminal 100, after finishing receiving responses from all of the image forming apparatus, displays the printer list on the operation panel as with reference numeral 903 (reference numeral 811). In the present embodiment, the image forming apparatus 102 whose Mopria setting is off is also displayed, unlike in the search procedure of the comparative example. By this, a user can know that the image forming apparatus 102 is equipped with a Mopria function but merely cannot be used because its setting is off. Accordingly, the user can subsequently easily realize printing that uses Mopria by changing the Mopria setting of the image forming apparatus 102 to on, or contacting an administrator of the image forming apparatus 102 to have them change the setting to on.

As described above, a mobile terminal (a communication terminal) according to the present embodiment searches for image forming apparatuses that can use a predetermined service (a print service), and displays one or more image forming apparatuses that responded to the search as search results. Furthermore, in the search results, the mobile terminal identifiably displays, in accordance with the response from each image forming apparatus, image forming apparatuses that can use the predetermined service, and image forming apparatuses that cannot use the predetermined service because a setting for the service is set to disabled. With this, by virtue of the present embodiment, when searching for an image forming apparatus that can use a predetermined service function, it is possible to output search results that identifiably include image forming apparatuses that, even if usage is disabled, can become usable if a setting of the image forming apparatus is changed.

Second Embodiment

Below, description will be given for a second embodiment of the present invention. In the foregoing first embodiment, description was given for a configuration in which image forming apparatuses whose Mopria setting is off are also displayed. In the present embodiment, description is given for a procedure that uses the same protocol as a protocol for printing to easily enable a Mopria setting to be changed to on. Note that, in the present embodiment, description regarding parts that are the same as those of the foregoing first embodiment is omitted, and only differences with the first embodiment are described. In addition, description is given here by taking as an example a print client that uses IPP as a print protocol, such as Mopria, but there is no limitation to this. A print protocol that a print client uses may be another protocol such as WSD (Web Services on Devices). In this case, it is assumed that communication with an image forming apparatus is by an operation compliant with specifications of an appropriate print protocol or print client, and a setting of the image forming apparatus is changed to a setting for accepting printing from the print client.

Figure 10:
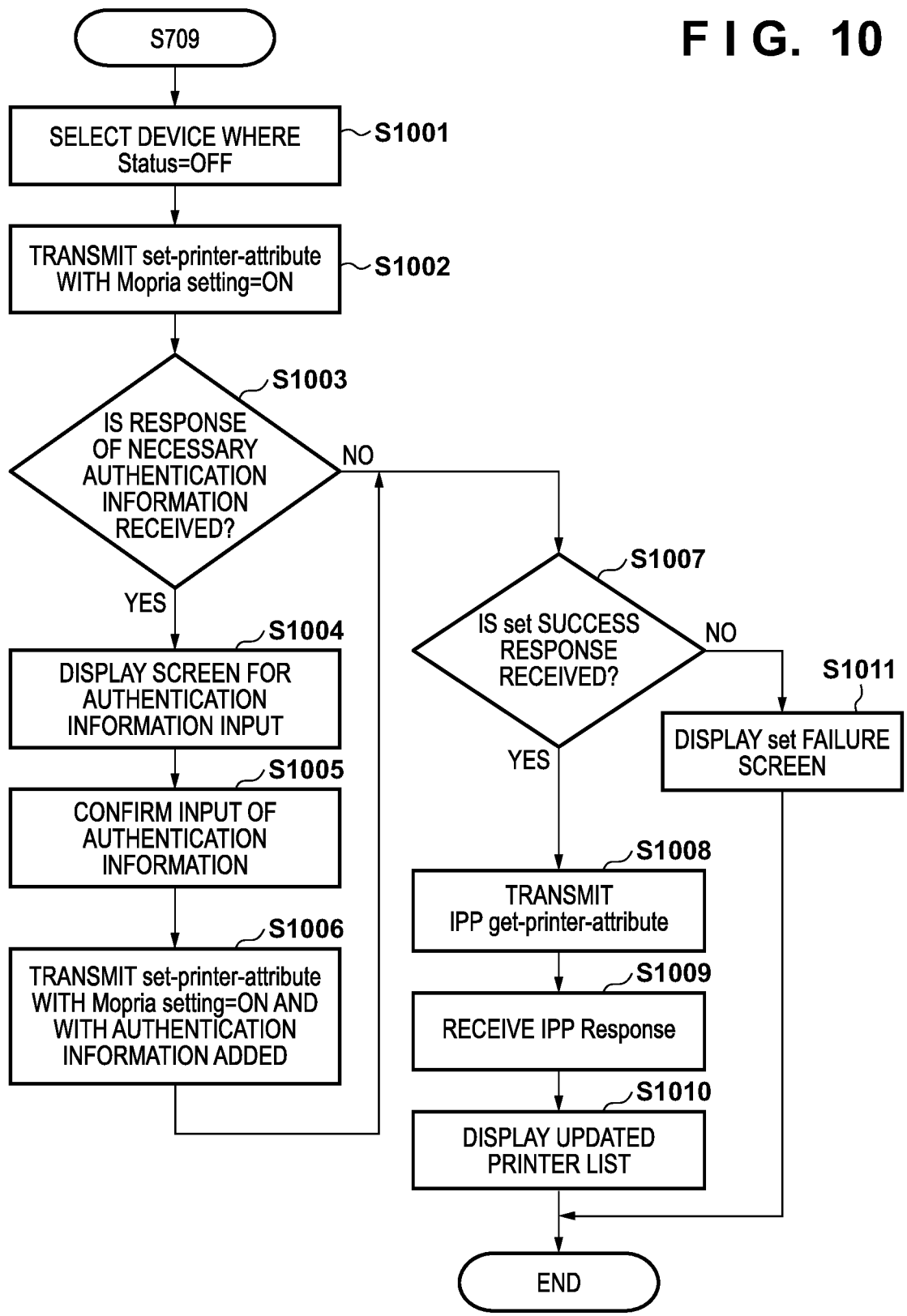
FIG. 10 is a search flowchart according to an embodiment.
Figure 11:
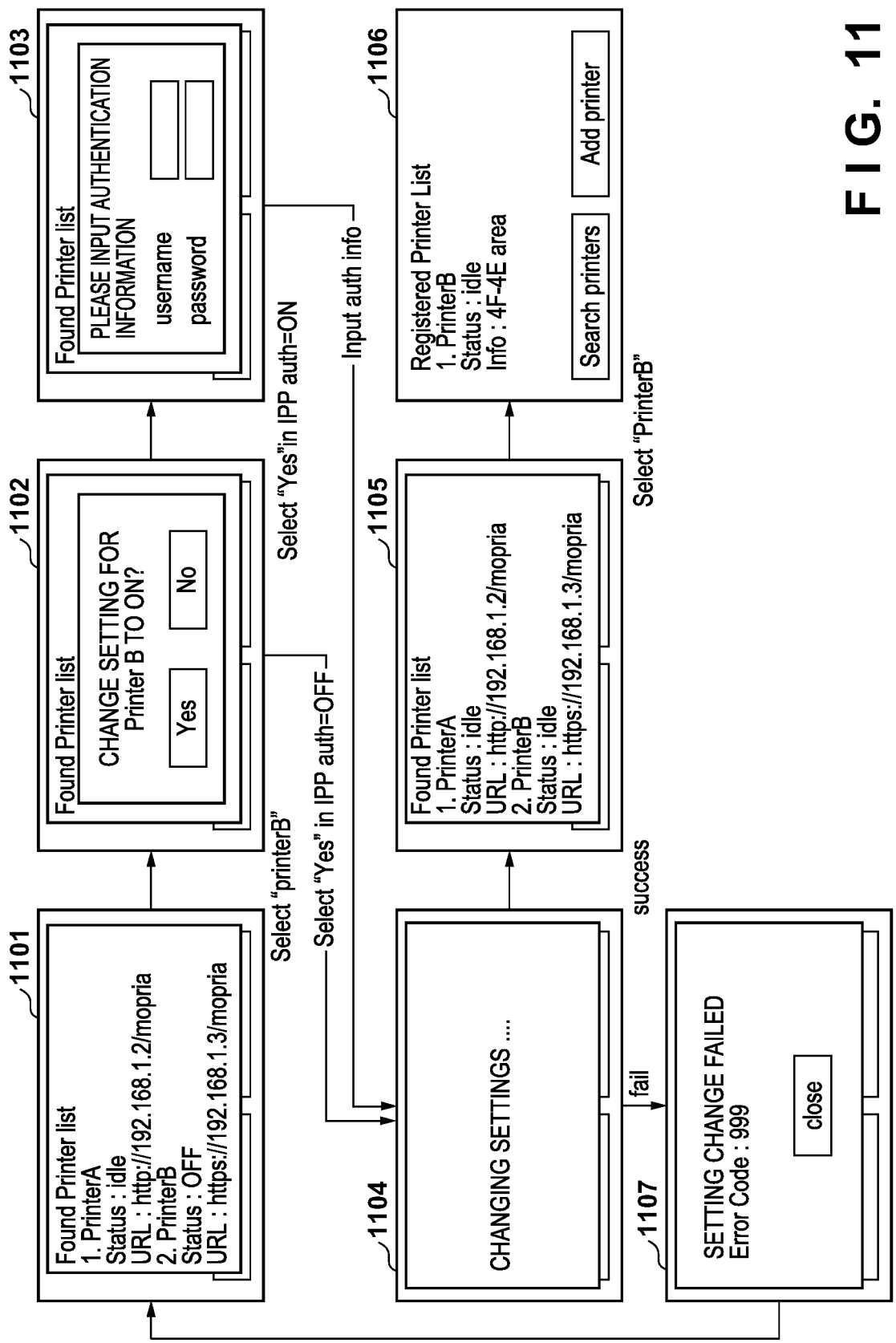
FIG. 11 is an operation panel of a mobile terminal according to an embodiment.
Figure 12:
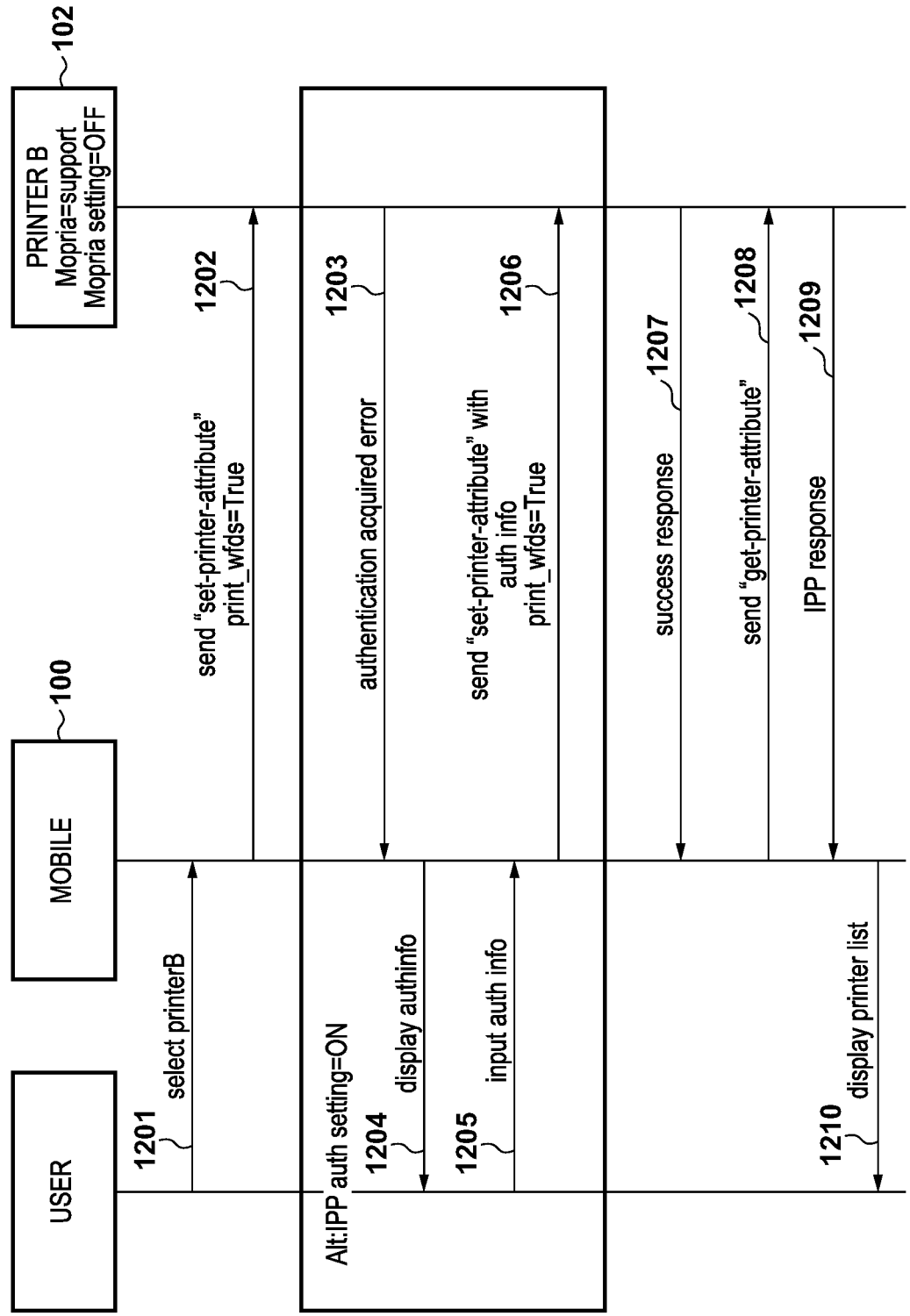
FIG. 12 is a search sequence diagram according to an embodiment.
Figure 13:
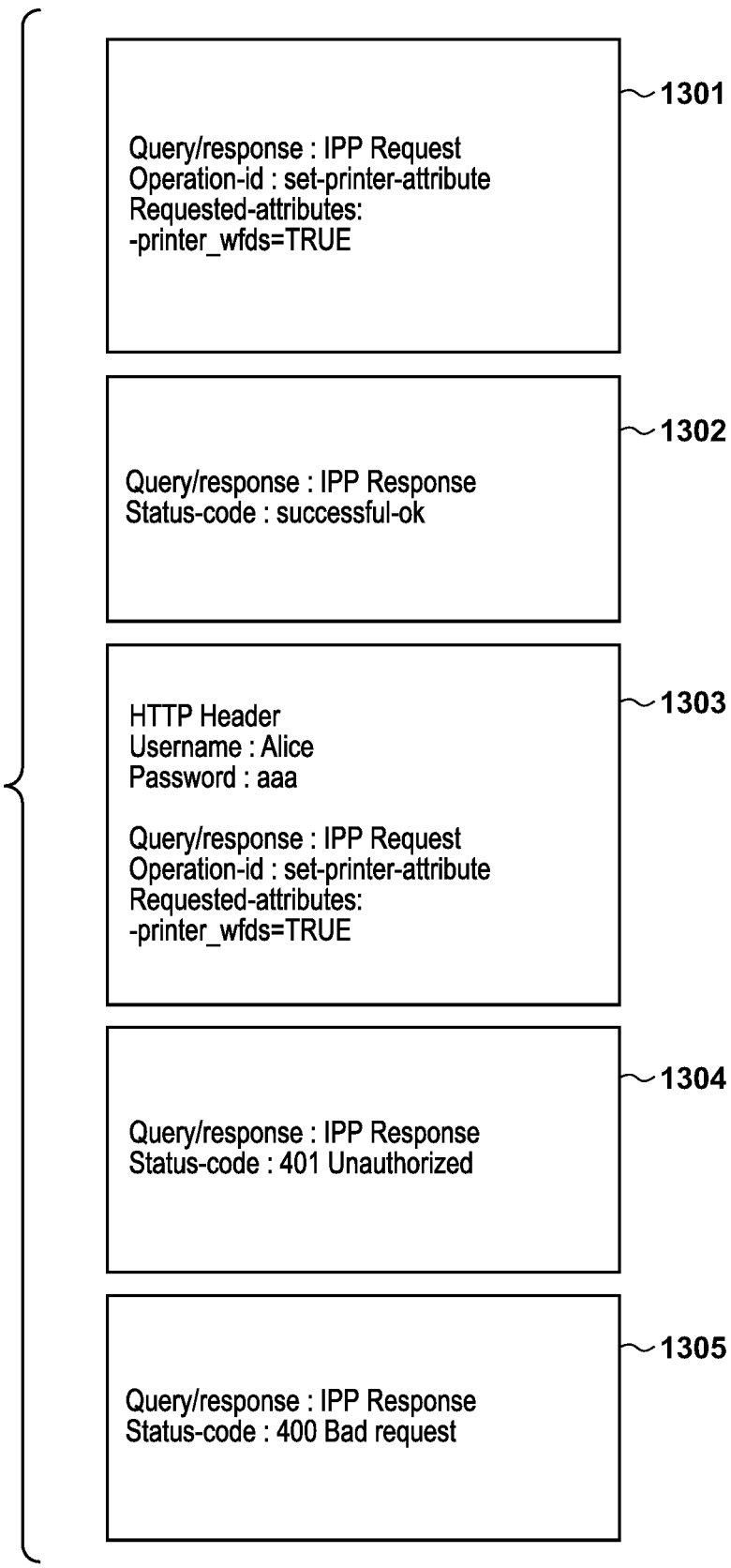
FIG. 13 is a view that illustrates packets for setting print information according to an embodiment.

With reference to FIG. 10 through FIG. 13, description is given for processing in which IPP is used to have the Mopria setting of the image forming apparatus 102 be turned on from the mobile terminal 100. The flowchart of FIG. 10 is detailed processing of step S709. Note that processing for the flowchart of FIG. 10 is executed by the CPU 201 executing a predetermined print application (for example, a Mopria print application) program installed in the mobile terminal 100, similar to in the first embodiment. It is assumed that some processing is realized by cooperation with an OS or various interface units. FIG. 11 is an example of operation panel screens of the mobile terminal 100 in the present embodiment. In addition, FIG. 12 is a sequence diagram for processing in which a Mopria setting is changed to on in the present embodiment. The screen for reference numeral 1101 has comparable display details to reference numeral 903 of the first embodiment. However, in the present embodiment, it is possible to selectably display each printer displayed in the printer list, and change the settings of the printer. Note that, printers for which the relevant function cannot be used, in other words printers for which it is possible to execute the relevant function but the setting has been turned off, may be selectably displayed by as grayed out. Here, a user selects the image forming apparatus 102 (a printer B) whose Mopria setting is off, and changes it to on. Description is given below from a state where the operation panel, in the first embodiment, displays the image forming apparatus 102 whose Mopria setting is off.

In step S1001, the mobile terminal 100 accepts from a user an operation for changing the Mopria setting of the image forming apparatus 102 to on (reference numeral 1201). Specifically, on the operation panel screen 1101, the user selects the printer B (the image forming apparatus 102). In response to this, the mobile terminal 100 transitions to a screen 1102, and displays a change screen (a confirmation screen) for whether or not to change the setting. In the screen 1102, when "Yes" is selected, in step S1002, the mobile terminal 100 transmits a packet for changing the Mopria setting to on, as in reference numeral 1301, to the image forming apparatus 102 (reference numeral 1202).

This packet uses IPP which is the same as the print protocol, and changes the value of "print_wfds" to TRUE by a "set-printer-attribute" operation. Next, in step S1003, the mobile terminal 100 determines whether a response of an authentication error was given (whether authentication was requested) as a response to "set-printer-attribute" as in reference numeral 1304 (reference numeral 1203). In other words, the mobile terminal 100 determines here whether or not authentication information is necessary so as to have a limitation to users having a certain level of authority or more.

Depending on the image forming apparatus, when performing a setting change in this way, there are cases where there is a limitation to users having a certain level of authority or more, and in this case, authentication is requested as in reference numeral 1304, so as to not allow a general user to change settings improperly. In a case of receiving an authentication error in step S1003, the mobile terminal 100, in step S1004, displays an authentication screen as in a screen 1103 that allows a user name and a password to be input to allow the user to input authentication information (reference numeral 1204). Upon confirming the user's authentication information input, the processing advances to step S1005, and the mobile terminal 100, in step S1006, transmits to the image forming apparatus 102 "set-printer-attribute" with the authentication information added thereto as in reference numeral 1303 (reference numerals 1205 and 1206).

In step S1007, the mobile terminal 100 determines whether or not "set-printer-attribute" succeeded. In a case where a success response as with reference numeral 1302 is received (reference numeral 1207), the mobile terminal 100, in step S1008, transmits to the image forming apparatus 102 a "get-printer-attribute", as in reference number 601, to obtained further detailed information of the image forming apparatus (reference numeral 1208). In step S1009, the mobile terminal 100 receives a response as with reference numeral 602 from the image forming apparatus 102 (reference numeral 1209), and, in step S1010, updates the printer list display by the information obtained to be as in a screen 1105 (reference numeral 1210).

Meanwhile, in a case where the mobile terminal 100 received a failure response as in 1305 in step S1007 (reference numeral 1209), the mobile terminal 100, in step S1011, displays that failure has occurred as in a screen 1106, and transitions to an original printer list display screen 1107 (reference numeral 1210).

As described above, convenience for the communication terminal improves because a user can, from the printer list of search results, quickly select, as a selectable printer, even a desired image forming apparatus having "Mopria setting=OFF", because this setting can be easily changed to on.

In addition, the present invention is not limited to the foregoing embodiment, and various modifications are possible. For example, configuration may be taken to, if an image forming apparatus having "Mopria setting=OFF" is selected, instead of transitioning to a screen or control for changing the setting, display a message prompting the user to inquire to an administrator because the function cannot be used with the current settings of the image forming apparatus.

Third Embodiment

Below, explanation will be given for a third embodiment of the present invention. In the present embodiment, description is given for a procedure that uses a different protocol as a protocol for printing to easily enable a Mopria setting to be changed to on. In addition, description is given by taking HTTP (Hypertext Transfer Protocol) as an example of a protocol that differs from IPP which is a print protocol, but another protocol may be used.

Figure 14:
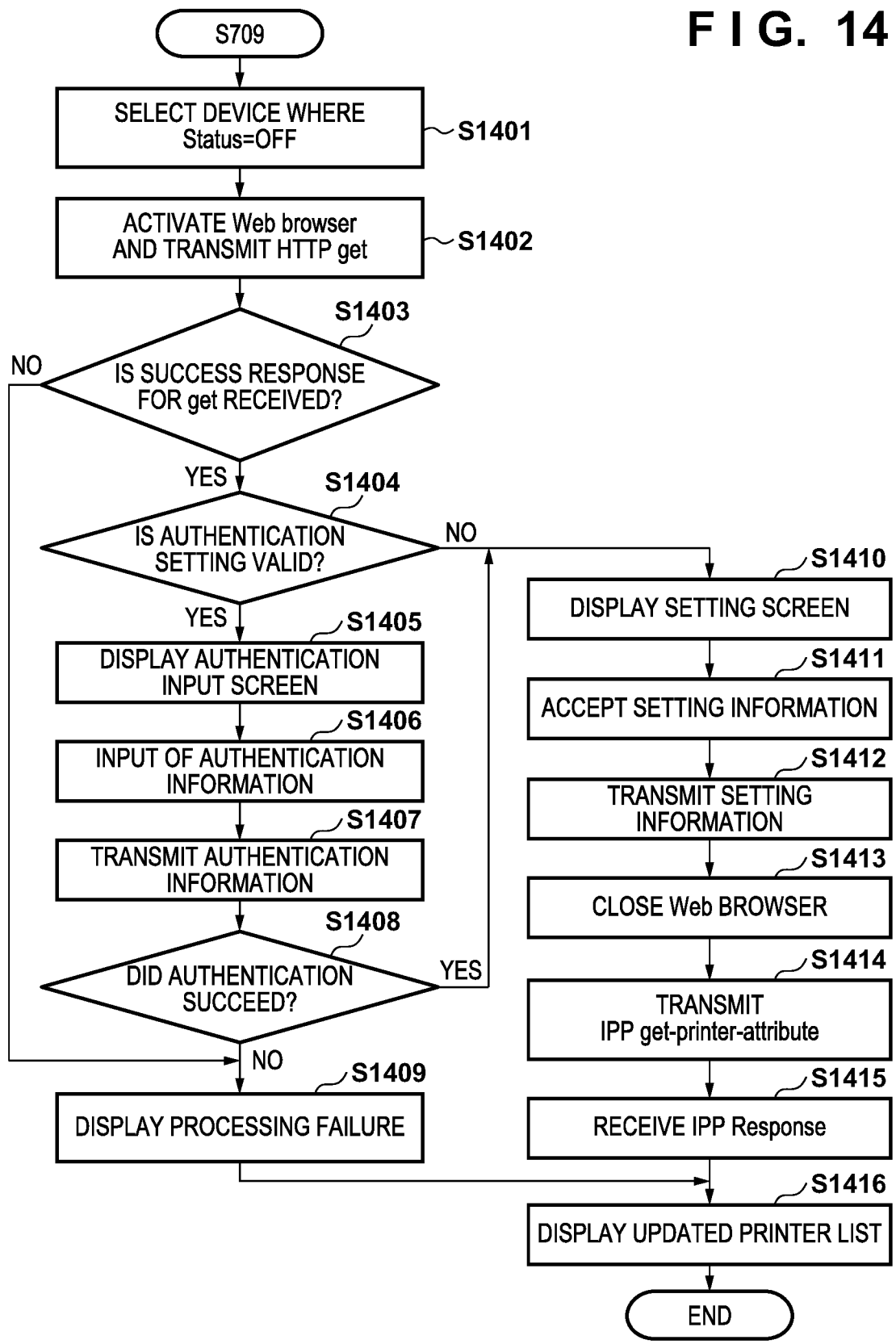
FIG. 14 is a search flowchart according to an embodiment.
Figure 15:
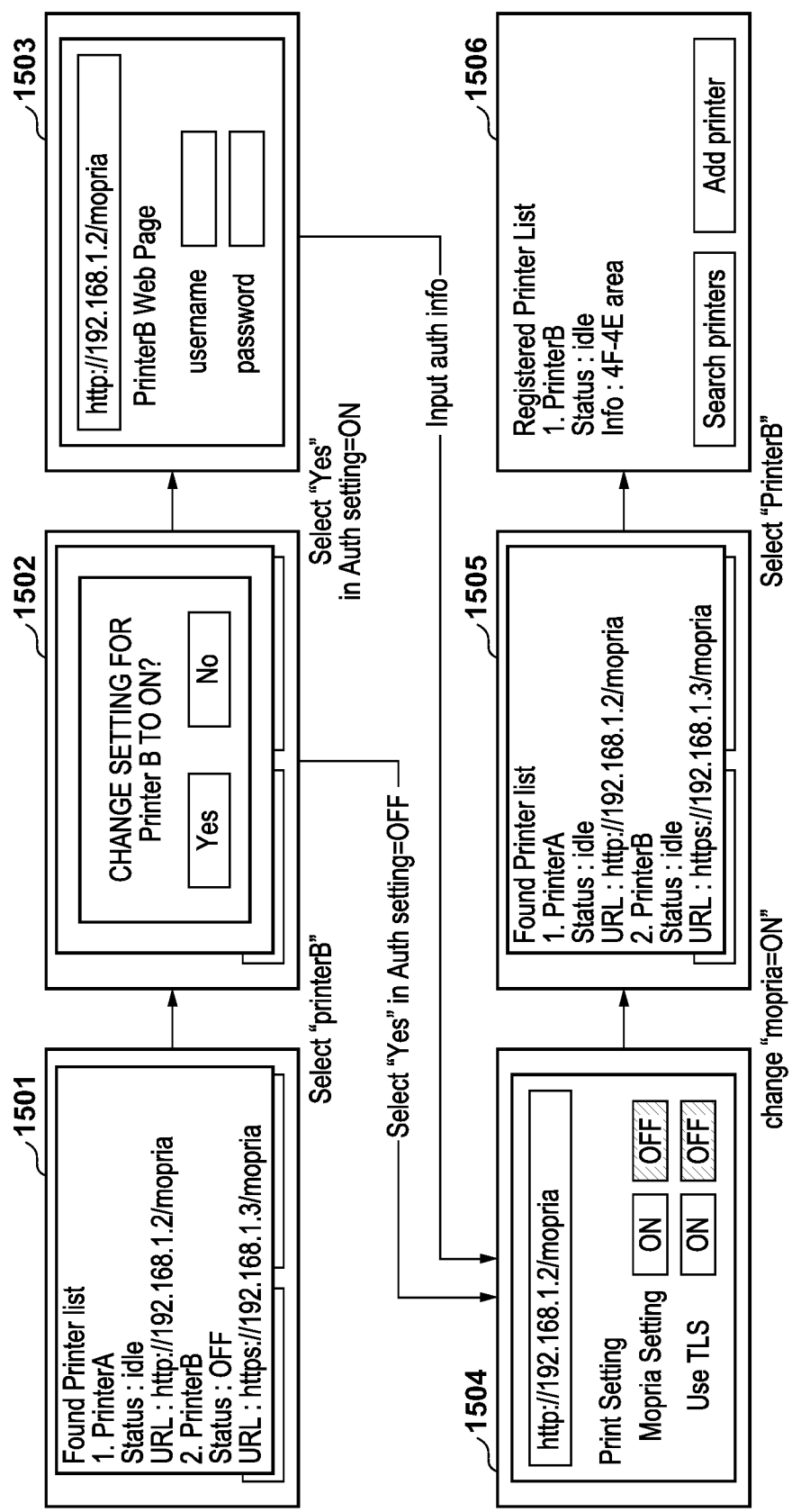
FIG. 15 is a view that illustrates an operation panel of a mobile terminal according to an embodiment.
Figure 16:
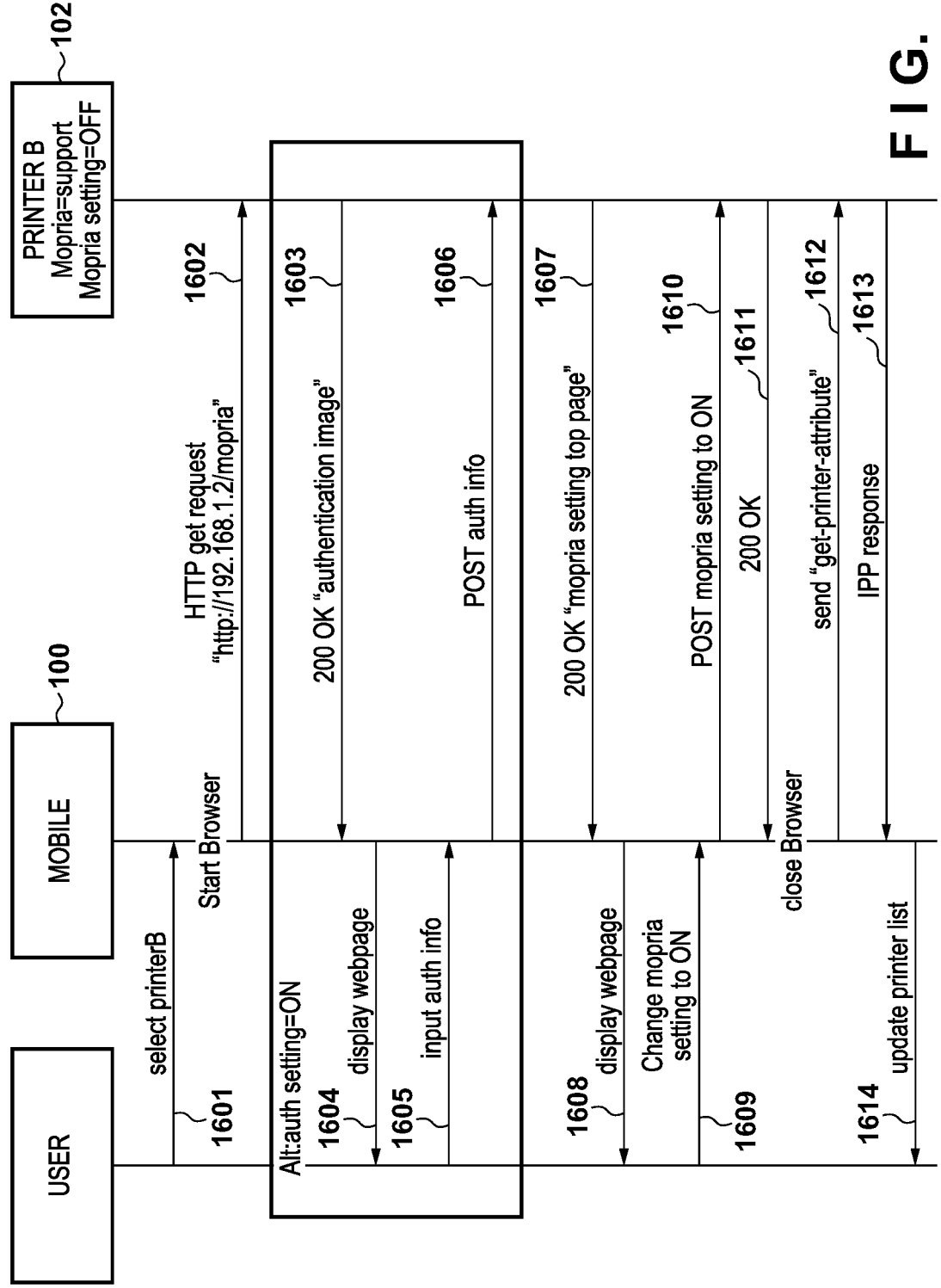
FIG. 16 is a search sequence diagram according to an embodiment.
Figure 17:
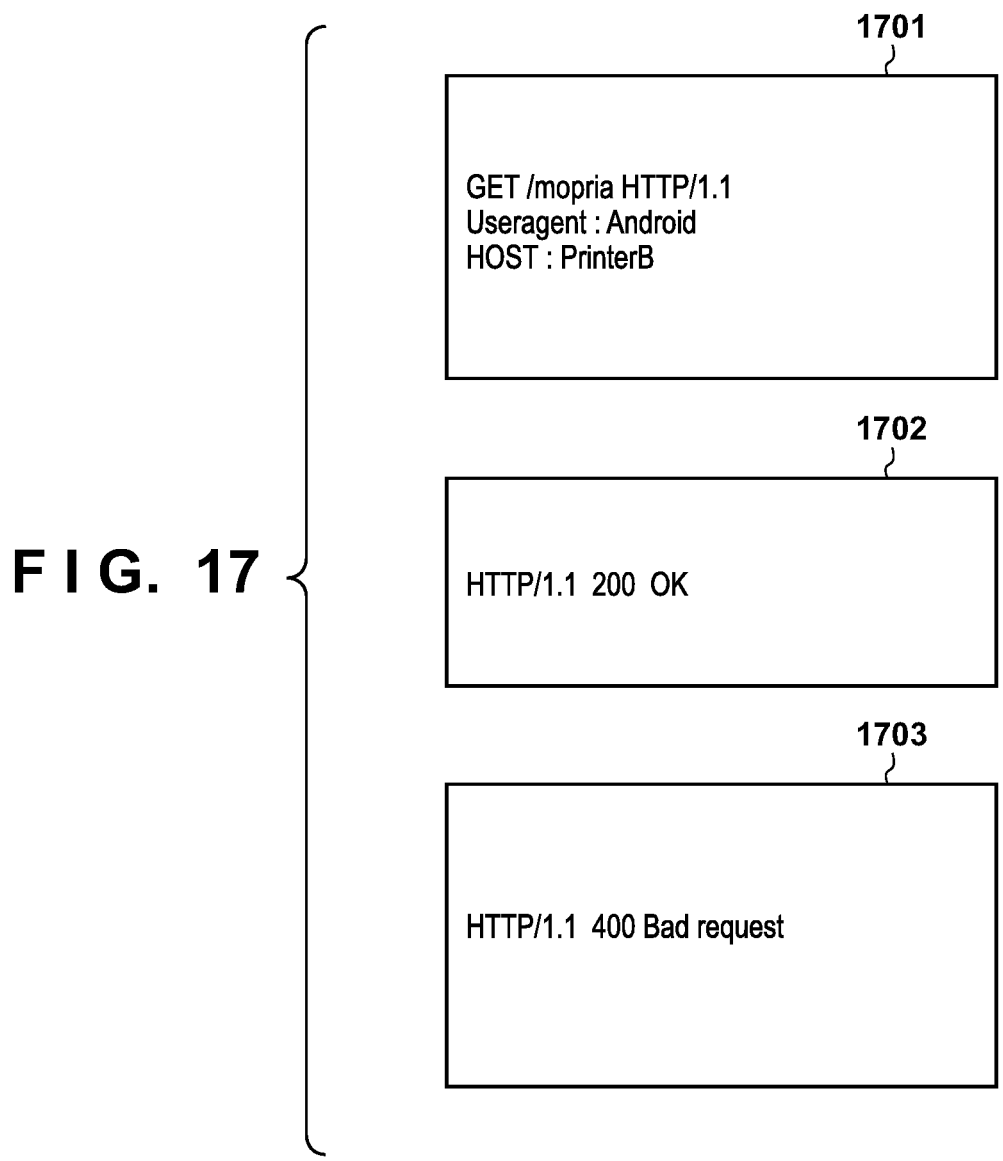
FIG. 17 is a view that illustrates packets for setting print information according to an embodiment.

With reference to FIG. 14 through FIG. 17, description is given for processing in which HTTP is used to have the Mopria setting of the image forming apparatus 102 be turned on from the mobile terminal 100. The flowchart of FIG. 14 is a variation of FIG. 10. Note that processing for the flowchart of FIG. 14 is executed by the CPU 201 executing a predetermined print application (for example, a Mopria print application) program or a Web browser application program installed in the mobile terminal 100, similar to in the first embodiment. It is assumed that some processing is realized by cooperation with an OS or various interface units. FIG. 15 is an example of operation panel screens of the mobile terminal 100 in the present embodiment. In addition, FIG. 16 is a sequence diagram for processing in which a Mopria setting is changed to on in the present embodiment.

In step S1401, the mobile terminal 100 accepts, from a user, a selection of the image forming apparatus 102 by a screen 1501 (reference numeral 1601), and displays a screen 1502. When "Yes" is selected on the screen 1502, the mobile terminal 100, in step S1402, activates the Web browser application, and transmits to the image forming apparatus 102 an HTTP packet (HTTP GET) for obtaining a Web page of the image forming apparatus 102 as with reference numeral 1701 (reference numeral 1602). Subsequently, in step S1403, the mobile terminal 100 determines whether or not a response to the HTTP packet from the image forming apparatus 102 indicates success. In the case of success (reference numerals 1603 and 1607), the processing proceeds to step S1404, and otherwise the processing proceeds to step S1409.

At this point, a URI (Uniform Resource Identifier) of a Web page designated by the mobile terminal 100 designates a URI included in an mDNS response, or designates an IP address of the image forming apparatus 102.

In step S1404, the mobile terminal 100 determines whether or not an authentication setting of the image forming apparatus 102 is enabled. If the authentication setting of the image forming apparatus 102 is enabled (reference numerals 1603 through 1606), the processing proceeds to step S1405, and otherwise the processing advances to step S1410 (reference numeral 1607 onward).

In step S1405, the mobile terminal 100 displays a Web page screen for a user to input a user name and a password as with a screen 1503 (reference numeral 1604). The mobile terminal 100, upon accepting input of authentication information from a user in step S1406 (reference numeral 1605), transmits the authentication information to the image forming apparatus 102 in step S1407 (reference numeral 1606). In step S1408, if there is authentication success by the mobile terminal 100 receiving a success packet as with reference numeral 1702, the processing proceeds to step S1410, but if there is failure the processing proceeds to step S1409.

In step S1410, the mobile terminal 100 displays a Web page as with a screen 1504 of the image forming apparatus 102 on the operation screen (reference numeral 1607). Next, in step S1411, a user performs input to change the Mopria setting to on, and the mobile terminal 100, having accepted information of this input, in step S1412 transmits to the image forming apparatus 102 an HTTP POST for turning the Mopria setting on (reference numeral 1610). Upon receiving a response to this HTTP POST (reference numeral 1611), the mobile terminal 100, in step S1413, terminates the Web browser, and returns to the original screen presented by the Mopria print application. In such a case, the mobile terminal 100, in step S1414, transmits "get-printer-attribute" to the image forming apparatus 102 (reference numeral 1612), and obtains detailed information of the image forming apparatus 102 in step S1415 (reference numeral 1613). In step S1416, the mobile terminal 100, upon obtaining the detailed information of the image forming apparatus 102, updates the printer list (reference numeral 1614), displays updated information as with a screen 1505, and then this processing ends.

In contrast, in a case of receiving an error in each step such as a setting failure as with reference numeral 1703, the mobile terminal 100, in step S1409, performs a display for notifying a user of the failure, and then ends this processing.

Thus, depending on the image forming apparatus, if the Mopria setting is off, it is possible that IPP which is a print protocol is also disabled. In this case, because there is failure even if "set-printer-attribute" is transmitted by IPP, by turning the Mopria setting on by a protocol that differs from IPP as in the present embodiment, it is possible to achieve an effect that is similar to that of the second embodiment described above. Note that, while the present embodiment exemplifies a case of transitioning to a Web browser application from a predetermined print application and changing a Mopria setting by communication via the Web browser, there is no limitation to this. Configuration may be taken to have the predetermined print application itself operate as a Web browser by embedding, in the predetermined print application, a display component such as WebView which is provided by the OS.

Fourth Embodiment

Below, description will be given for a fourth embodiment of the present invention. In the present embodiment, description is given regarding a procedure that can change a Mopria setting to on in a case of searching by designating an IP address.

Figure 18:
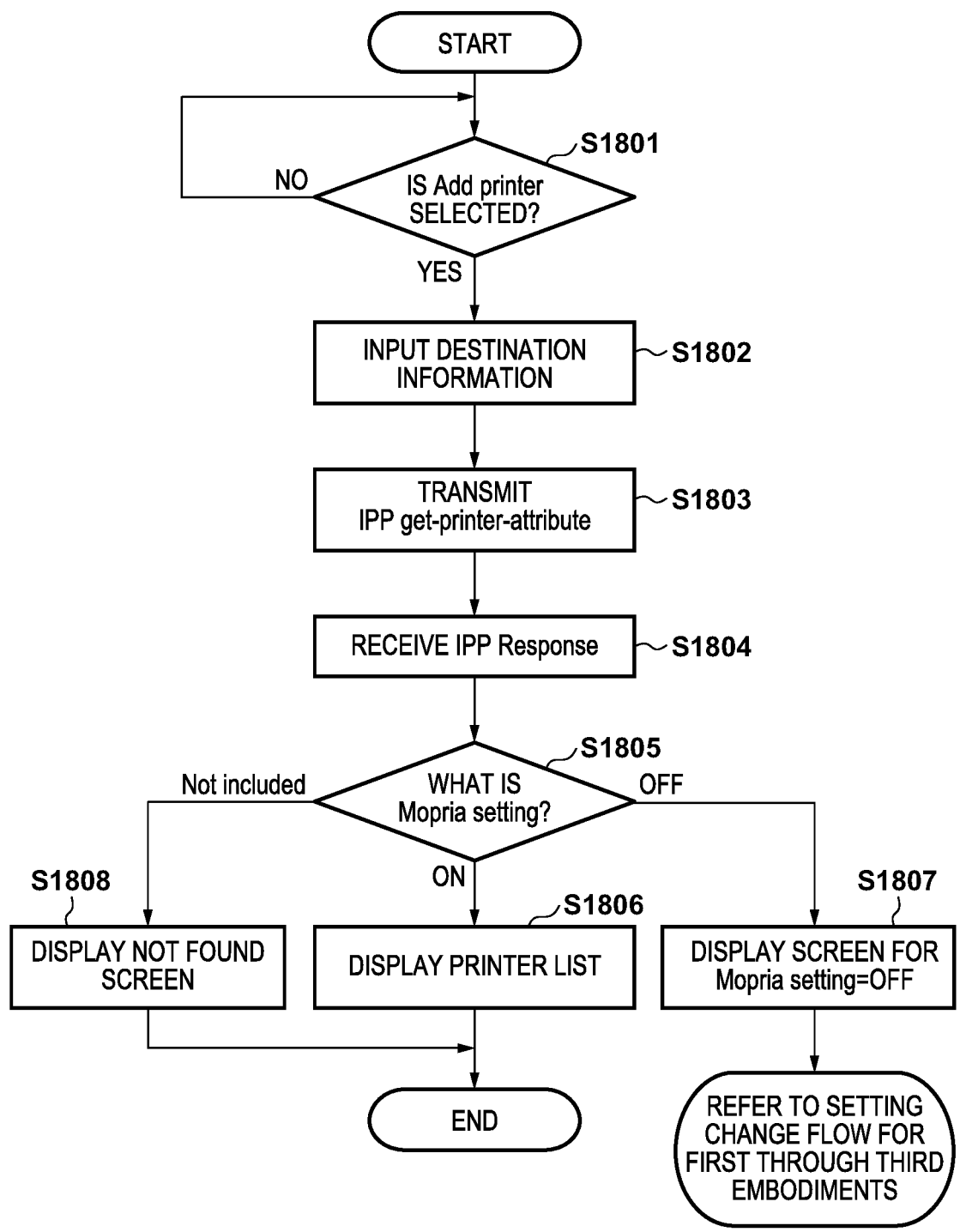
FIG. 18 is a search flowchart according to an embodiment.
Figure 19:
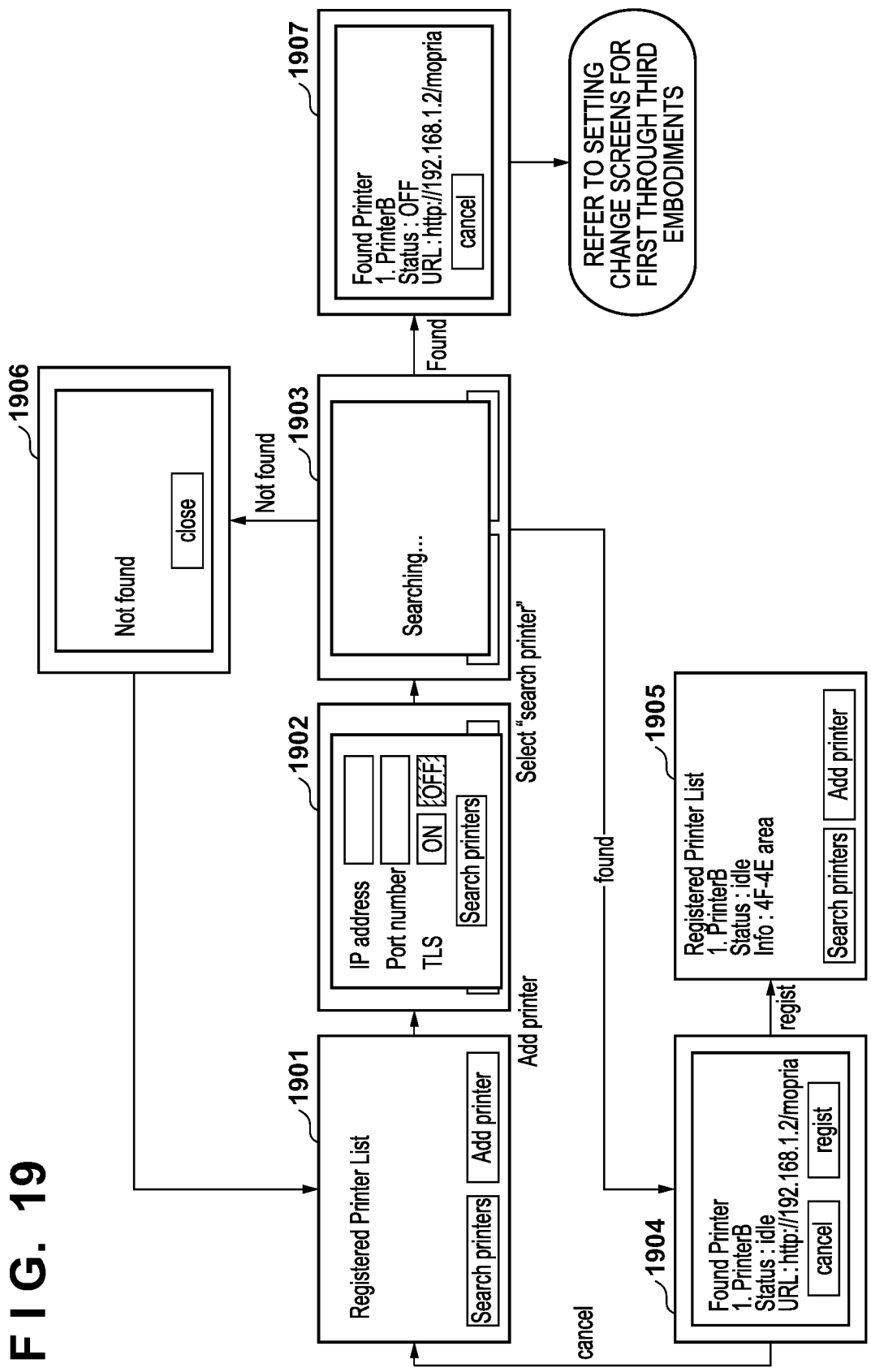
FIG. 19 is a view that illustrates an operation panel of a mobile terminal according to an embodiment.

With reference to FIG. 18 through FIG. 20, description is given for processing in which the image forming apparatus 102 is searched for from the mobile terminal 100 by the designation of an IP address, and subsequently the Mopria setting for the image forming apparatus 102 is turned on. FIG. 19 is an example of operation panel screens of the mobile terminal 100 in the present embodiment. In addition, FIG. 20 is a sequence diagram for processing in which a Mopria setting is changed to on in the present embodiment.

In step S1801, the mobile terminal 100 detects that "Add printer" has been selected from a screen 1901 (reference numeral 2001), and displays a screen for input, such as an IP address for an image forming apparatus to be searched for, as with a screen 1902 (reference numeral 2002). In step S1802, the mobile terminal 100, having accepted, from a user, input information of an image forming apparatus such as an IP address, transmits "get-printer-attribute" addressed to the IP address designated in step S1803 (reference numeral 2004). In step S1804, the mobile terminal 100 receives a response from the image forming apparatus 102 as with reference numeral 602 (reference numeral 2005).

Next, in step S1805, the mobile terminal 100 confirms values for "Mopria_certified" and "Print_wfds" of the Mopria setting from out of the response data. If "Mopria_certified" is included and the "Print_wfds" setting value is true, the mobile terminal 100, in step S1806, displays search results indicating a printer state as in a screen 1904 (reference numeral 2006), and this processing ends.

However, if the "Print_wfds" setting value is false, the mobile terminal 100, in step S1807, displays a search result indicating that the Mopria setting is off, as with a screen 1907. A sequence for a user to select an image forming apparatus from the screen 1907 and turn the Mopria setting on complies with a change sequence of the first through third embodiments described above. In addition, if this setting value is not included, the mobile terminal 100, in step S1808, determines that this is an image forming apparatus which is not equipped with a Mopria function, displays a screen with nothing found as in a screen 1906, and ends this processing.

By virtue of the present embodiment as described above, even when a search is made by an IP address designation, convenience improves because a user can determine from a printer list of search results whether a desired image forming apparatus has "Mopria setting=OFF", and can easily change the setting to be on.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-006689 filed on Jan. 18, 2018, which is hereby incorporated by reference herein in its entirety.

What is claimed is:

1. A communication terminal in which a mobile application and a web browser application are installed, comprising:
   a display unit;
   a memory device that stores applications; and
   at least one processor that executes the mobile application stored in the memory device to:
      search for image forming apparatuses that can use a print service;
      display on the display unit one or more image forming apparatuses that responded to the search, and, in accordance with a response from each image forming apparatus, display on the display unit a mobile application screen in which it is possible to identify a first image forming apparatus that can use the print service and a second image forming apparatus that cannot use the print service,
   wherein the at least one processor executes the web browser application stored in the memory device to:
      request, using an HTTP (Hypertext Transfer Protocol), a web page for performing setting to activate or not to activate the print service on the second image forming apparatus, in a case where a user selects the second image forming apparatus via the mobile application screen;
      display the web page; and
      transmit, using the HTTP, an attribute change request to activate the print service in a case where the setting to activate the print service is received via the web page,
   wherein the at least one processor executes the mobile application stored in the memory device to:
   after the attribute change request is transmitted using the HTTP, obtain attribute information of the second image forming apparatus using an IPP (Internet Printing Protocol), and change a display of the second image forming apparatus displayed on the mobile application screen to a display of an image forming apparatus that can use the print service.

2. The communication terminal according to claim 1, wherein
   the at least one processor executes the mobile application stored in the memory device to:

do not display on the display unit a third image forming apparatus that does not support the print service as a search result.

3. The communication terminal according to claim 1, wherein
the at least one processor executes the mobile application stored in the memory device to:
selectably display on the display unit the first image forming apparatus that can use the print service, and the second image forming apparatus that cannot use the print service.

4. The communication terminal according to claim 3, wherein
the at least one processor executes the web browser application stored in the memory device to:
in a case where the selectably displayed second image forming apparatus that cannot use the print service is selected by a user, display on the display unit a message prompting that inquiries be made to an administrator because the print service cannot be used with the present settings of the second image forming apparatus.

5. The communication terminal according to claim 3, wherein
the at least one processor executes the web browser application stored in the memory device to:
in a case where the selectably displayed second image forming apparatus that cannot use the print service is selected by a user, display on the display unit a change screen for changing a setting of the second image forming apparatus.

6. The communication terminal according to claim 5, wherein
the at least one processor executes the web browser application stored in the memory device to:
upon receiving a setting change from a user via the change screen, request, using the HTTP, the second image forming apparatus to change the setting.

7. The communication terminal according to claim 6, wherein
the at least one processor executes the mobile application stored in the memory device to:
after the change of the setting of the second image forming apparatus is requested, upon being requested by the second image forming apparatus for authentication in order to change the setting of the print service, display on the display unit an authentication screen for authentication of a user, and accept authentication information.

8. The communication terminal according to claim 6, wherein
the at least one processor executes the mobile application stored in the memory device to:
use the IPP to obtain, from each image forming apparatus, information on whether or not the print service is supported, and, in a case where the print service is supported, information indicating whether the setting is enabled or disabled.

9. The communication terminal according to claim 8, wherein
the at least one processor executes the mobile application stored in the memory device to:
use the IPP to request the second image forming apparatus to change the setting.

10. The communication terminal according to claim 8, wherein
the at least one processor executes the web browser application stored in the memory device to:
use the HTTP to request the second image forming apparatus to change the setting.

11. The communication terminal according to claim 1, wherein
the at least one processor executes the mobile application stored in the memory device to:
by transmitting a search request packet in accordance with mDNS to each image forming apparatus, obtain information on whether or not the image forming apparatus supports the print service, and, in a case where the print service is supported, information indicating whether the setting is enabled or disabled.

12. The communication terminal according to claim 1, wherein
the at least one processor executes the mobile application stored in the memory device to:
use an IP address, designated by a user, of a predetermined image forming apparatus to obtain information on whether or not the image forming apparatus supports the print service, and, in a case where the print service is supported, information indicating whether the setting is enabled or disabled.

13. A method of controlling a communication terminal provided with a display unit and in which a mobile application and a web browser application are installed, the method comprising:
searching, in the mobile application, for image forming apparatuses that can use a print service;
displaying, in the mobile application, on the display unit one or more image forming apparatuses that responded to the searching, and, in accordance with a response from each image forming apparatus, displaying on the display unit a mobile application screen in which it is possible to identify a first image forming apparatus that can use the print service and a second image forming apparatus that cannot use the print service;
requesting, in the web browser application and using an HTTP (Hypertext Transfer Protocol), a web page for performing setting to activate or not to activate the print service on the second image forming apparatus in a case where a user selects the second image forming apparatus via the mobile application screen;
displaying, in the web browser application, the web page;
transmitting, in the web browser application and using the HTTP, an attribute change request to activate the print service in a case where the setting to activate the print service is received via the web page; and
in the mobile application, after the attribute change request is transmitted using the HTTP, obtaining attribute information of the second image forming apparatus using an IPP (Internet Printing Protocol), and changing a display of the second image forming apparatus displayed on the mobile application screen to a display of an image forming apparatus that can use the print service.

14. A non-transitory storage medium storing programs, including a mobile application and a web browser application, for causing a computer of a communication terminal provided with a display unit to execute:
searching, in the mobile application, for image forming apparatuses that can use a print service;
displaying, in the mobile application, on the display unit one or more image forming apparatuses that responded to the searching, and, in accordance with a response from each image forming apparatus, displaying on the display unit a mobile application screen in which it is possible to identify a first image forming apparatus that can use the print service and a second image forming apparatus that cannot use the print service;

requesting, in the web browser application and using an HTTP (Hypertext Transfer Protocol), a web page for performing setting to activate or not to activate the print service on the second image forming apparatus in a case where a user selects the second image forming apparatus via the mobile application screen;

displaying, in the web browser application, the web page;

transmitting, in the web browser application and using the HTTP, an attribute change request to activate the print service in a case where the setting to activate the print service is received via the web page; and in the mobile application, after the attribute change request is transmitted using the HTTP, obtaining attribute information of the second image forming apparatus using an IPP (Internet Printing Protocol), and changing a display of the second image forming apparatus displayed on the mobile application screen to a display of an image forming apparatus that can use the print service.

15. The communication terminal according to claim 1, wherein the at least one processor executes the web browser application stored in the memory device to:

obtain, using the HTTP, an authentication screen for accepting an input of authentication information in a case where a user selects the second image forming apparatus via the mobile application screen, and display the authentication screen, and set to enabled the setting of the print service set in the second image forming apparatus in a case where it is determined that the inputted authentication information via the authentication screen is authentication information of a user who has a certain authority in the second image forming apparatus.

* * * * *